United States Patent
Kimura

(10) Patent No.: US 10,212,318 B2
(45) Date of Patent: Feb. 19, 2019

(54) IMAGE PICKUP APPARATUS SUCH AS NETWORK CAMERA, AND IMAGE MONITORING SYSTEM

(71) Applicant: CANON KABUSHIKI KAISHA, Tokyo (JP)

(72) Inventor: Yasunori Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/584,188

(22) Filed: May 2, 2017

(65) Prior Publication Data

US 2017/0331987 A1 Nov. 16, 2017

(30) Foreign Application Priority Data

May 11, 2016 (JP) ................................. 2016-095440
Mar. 28, 2017 (JP) ................................. 2017-062928

(51) Int. Cl.
*H04N 5/225* (2006.01)
*G03B 17/02* (2006.01)
(Continued)

(52) U.S. Cl.
CPC ......... *H04N 5/2252* (2013.01); *G03B 11/045* (2013.01); *G03B 15/03* (2013.01);
(Continued)

(58) Field of Classification Search
CPC .. H04N 5/2251; H04N 5/2252; H04N 5/2256; H04N 5/2259; H04N 5/23238;
(Continued)

(56) References Cited

U.S. PATENT DOCUMENTS

2007/0228306 A1 10/2007 Gannon et al.
2012/0154888 A1 6/2012 Kato et al.
(Continued)

FOREIGN PATENT DOCUMENTS

| JP | 2005-136800 A | 5/2005 |
| JP | 2009-135723 A | 6/2009 |
| WO | 02/03700 A2 | 1/2002 |

OTHER PUBLICATIONS

Sep. 20, 2017 European Search Report in European Patent Appln. No. 17169857.4.

*Primary Examiner* — Paul M Berardesca
(74) *Attorney, Agent, or Firm* — Venable LLP

(57) ABSTRACT

An image pickup apparatus which is able to obtain images with high sharpness by improving circulation of air in the image pickup apparatus to prevent formation of condensation and frost on a cover, which protects a lens unit, while ensuring imperviousness to light. An illumination unit provided around a lens unit emits illumination light toward a subject through the cover placed on a subject side of the lens unit. An annular light-shielding member between the lens unit and the cover prevents the illumination light from reflecting on the cover to enter the lens unit and shields reflected light of the illumination light. The light-shielding member has a circulation path that enables circulation of air between a space on the subject side of the lens unit and on an inner peripheral side of the light-shielding member and a space on an outer peripheral side of the light-shielding member.

15 Claims, 8 Drawing Sheets

(51) Int. Cl.
  *G03B 15/03*   (2006.01)
  *G03B 11/04*   (2006.01)
  *G03B 17/55*   (2006.01)
  *G08B 13/196*  (2006.01)

(52) U.S. Cl.
  CPC .............. *G03B 17/02* (2013.01); *G03B 17/55* (2013.01); *G08B 13/1963* (2013.01); *G08B 13/19619* (2013.01); *H04N 5/2251* (2013.01); *H04N 5/2256* (2013.01)

(58) Field of Classification Search
  CPC .......... H04N 7/18–7/188; G03B 17/02–17/17; G03B 11/04; G03B 11/043; G03B 11/045; G03B 11/048; G08B 13/19617–13/1963
  See application file for complete search history.

(56) References Cited

U.S. PATENT DOCUMENTS

2014/0009619 A1   1/2014  Koppe
2017/0205686 A1*  7/2017  Bingleman ............ G03B 17/55

* cited by examiner

IMAGE PICKUP APPARATUS SUCH AS NETWORK CAMERA, AND IMAGE MONITORING SYSTEM

BACKGROUND OF THE INVENTION

Field of the Invention

The present invention relates to an image pickup apparatus such as a surveillance camera e.g. a network camera equipped with an illumination unit, and an image monitoring system.

Description of the Related Art

Some network surveillance cameras incorporate an illumination unit between a dome-shaped cover, which protects an image pickup unit, and the image pickup unit so as to enable shooting in dark places. In the surveillance cameras, a light-shielding member is provided between the image pickup unit and the illumination unit so as to prevent illumination light, which is emitted from the illumination unit toward a subject, from being reflected on the dome-shaped cover or the like, entering a lens of the image pickup unit, and appearing in a captured image (Japanese Laid-Open Patent Publication (Kokai) No. 2005-136800).

On the other hand, particularly in a surveillance camera for which a sealed structure is adopted, condensation and frost occur on inner and outer surfaces of a dome-shaped cover due to insufficient circulation of air in the surveillance camera or a temperature difference between an inside and outside of the surveillance camera in a low-temperature environment and the like. This leads to degradation in sharpness of a captured image. For this reason, there has been proposed a technique according to which condensation and frost are prevented from occurring on the inner and outer surfaces of the dome-shaped cover by causing air to circulate in the surveillance camera through natural convection using a permeable film or a dehumidification element provided inside the surveillance camera, or by forcing air in the surveillance camera to circulate using a fan or the like (see Japanese Laid-Open Patent Publication (Kokai) No. 2009-135723).

According to Japanese Laid-Open Patent Publication (Kokai) No. 2005-136800 above, however, an annular light-shielding member is placed in a state of being brought into close contact with an inner wall of the dome-shaped cover. Therefore, when air inside the surveillance camera is circulated using the permeable film or the dehumidification element or using the fan, air resists being circulated between a space on a front side of the lens unit and on an inner peripheral side of the light-shielding member and a space inside the dome-shaped cover and on an outer peripheral side of the light-shielding member. Thus, in the surveillance camera equipped with the illumination unit, it is difficult to prevent condensation and frost from occurring on the inner and outer surfaces of the dome-shaped cover.

SUMMARY OF THE INVENTION

The present invention provides an image pickup apparatus and an image monitoring system which are capable of obtaining images with high sharpness by improving circulation of air inside the image pickup apparatus, which is equipped with an illumination unit, and preventing formation of condensation and frost on a cover, which protects a lens unit, while ensuring imperviousness to light.

Accordingly, the present invention provides an image pickup apparatus comprising a lens unit, a cover configured to be placed on a subject side of the lens unit and protect the lens unit, an illumination unit configured to be provided around the lens unit and emit illumination light toward the subject through the cover, and an annular light-shielding member configured to be provided between the lens unit and the cover in a state of being in close contact with the cover and to shield reflected light of the illumination light so as to prevent the illumination light emitted from the illumination unit from being reflected by the cover and entering the lens unit, wherein the light-shielding member has a circulation path that enables circulation of air between a space on the subject side of the lens unit and on an inner peripheral side of the light-shielding member and a space on an outer peripheral side of the light-shielding member.

According to the present invention, in the image pickup apparatus equipped with the illumination unit, circulation of air in the apparatus is improved to prevent formation of condensation and frost on inside and outside surfaces of the cover, which protects the lens unit, while imperviousness to light is ensured. As a result, image with high sharpness are obtained.

Further features of the present invention will become apparent from the following description of exemplary embodiments (with reference to the attached drawings).

DESCRIPTION OF THE EMBODIMENTS

Hereafter, an exemplary embodiment of the present invention will be described with reference to the drawings.

Figure 1A:
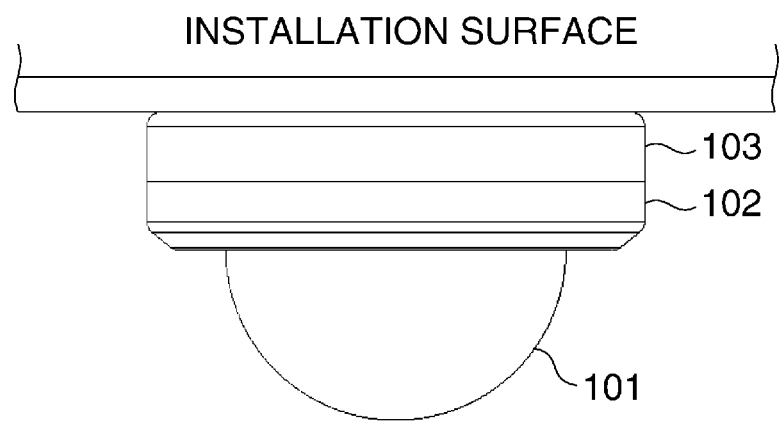
FIGS. 1A and 1B are an external view and an exploded perspective view, respectively, showing a network surveillance camera that is an exemplary embodiment of an image pickup apparatus according to the present invention.
Figure 1B:
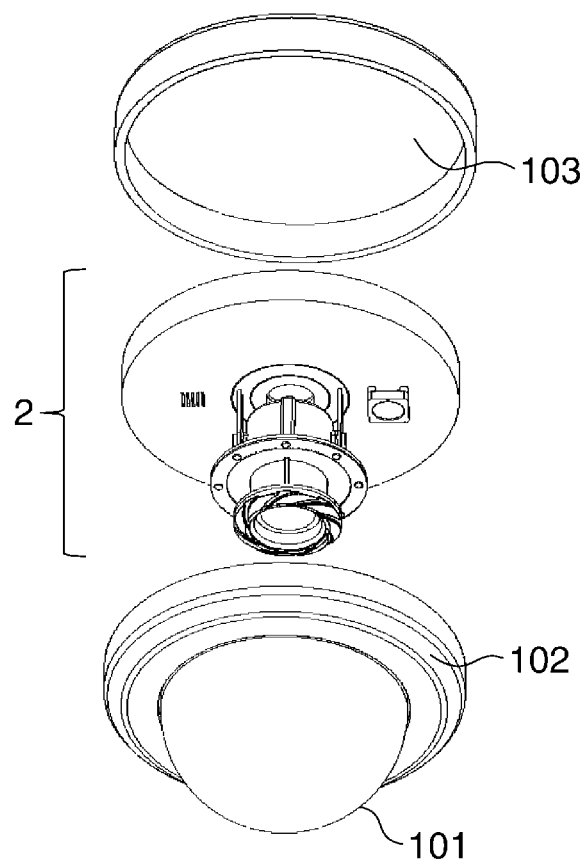

FIG. 1A is an external view showing a network surveillance camera (hereafter referred to as the surveillance camera) that is an exemplary embodiment of an image pickup apparatus according to the present invention, and FIG. 1B is an exploded perspective view showing the surveillance camera in FIG. 1A. Although in the present embodiment, it is assumed that the surveillance camera constituting an image monitoring system, which is connected to a server (monitoring apparatus) at an outside image monitoring center or the like via a wireless or wired connection such that they are able to communicate with each other and in which the server monitors captured images, is taken as an example, but the present invention should not necessarily be applied to the surveillance camera.

As shown in FIGS. 1A and 1B, in the surveillance camera according to the present embodiment, an image pickup unit 2 is provided inside an exterior cover formed by an upper cover 103, a lower cover 102, and a dome-shaped cover 101 (hereafter referred to as the dome cover 101). The dome cover 101 is a substantially hemispherical transparent member which is placed on a front side (subject side) in a shooting range of a lens unit 201 (see FIG. 2) of the image pickup unit 2 and protects the lens unit 201.

A printed circuit board, not shown, as well as the image pickup unit 2 is provided inside the exterior cover. Electric components such as a heater, a microphone, a speaker, an LED, and a motor, all of which are not shown, as well are provided inside the exterior cover and connected to one another via electric cables, FPC and FFC connectors, and so forth. It should be noted that in the present embodiment, a seal material, not shown, is interposed between the dome cover 101 and the lower cover 102 and between the lower cover 102 and the upper cover 103 so that the surveillance camera can have a sealed structure, but whether or not the surveillance camera has the sealed structure may be arbitrarily determined.

A video process engine, a communication process engine, a memory, a power supply system IC, and so forth are disposed on the printed circuit board. Also, an RJ45 connector, an external input-output connector, a power source connector, a voice input-output connector, a video out connector, an external memory connector such as an SD card, and so forth are mounted as external interfaces on the printed circuit board.

Figure 2:
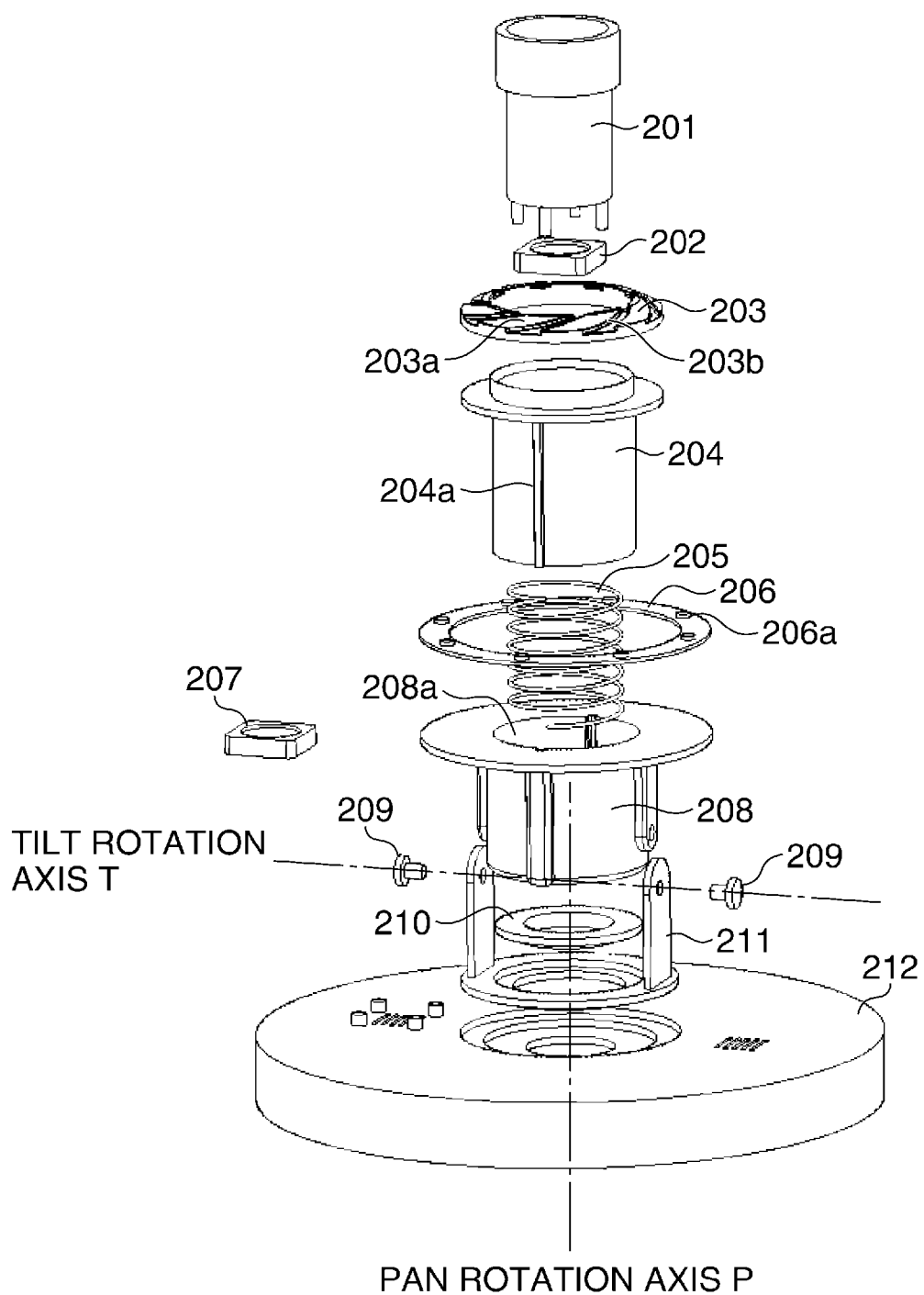
FIG. 2 is an exploded perspective view showing an image pickup unit.

FIG. 2 is an exploded perspective view showing the image pickup unit 2. As shown in FIG. 2, the image pickup unit 2 has the lens unit 201, fans 202 and 207, a printed circuit board 206, a light-shielding member 203, a supporting member 204, a main base 212, a pan base 211, fixing members 209 and 210, and a tilt base 208.

The lens unit 201 has a lens group, not shown, a lens holder, a printed circuit board, an image pickup device, and so forth. The fans 202 and 207 are run to facilitate circulation of air inside the surveillance camera and effectively prevent formation of condensation and frost, to be described later. The fan 202 placed on a rear side of the lens unit 201 may blow air either frontward or rearward in a direction of an optical axis of the lens unit 201.

The printed circuit board 206, which is substantially annular in shape, is placed around the lens unit 201 and fixed to the tilt base 208 with a double-faced tape, an adhesive agent, or the like. The printed circuit board 206 has at least one illumination unit 206a. It should be noted that a direction in which the illumination unit 206a emits illumination light is ordinarily the direction of the optical axis of the lens unit 201 but may be another direction. Although in FIG. 2, the printed circuit board 206 is substantially annular in shape, the print circuitry board 206 may be shaped by dividing a substantial annular shape into an arbitrary number of areas or may be polygonal.

The light-shielding member 203, which is substantially annular in shape, prevents illumination light, which is emitted from the illumination unit 206a toward a subject, from being reflected by the dome cover 101, entering the lens unit 201, and appearing in a captured image. A close contact portion 203a (FIGS. 4A and 4B) which is brought into close contact with the dome cover 101 is provided on a surface of the light-shielding member 203 which is opposed to the dome cover 101. On the surface of the light-shielding member 203 which is opposed to the dome cover 101, groove portions 203b which are, for example, spiral, crank-shaped, or linear as will be described later are formed in a state of being not in close contact with the dome cover 101. The groove portions 203b function as circulation paths which enable circulation of air between a space on the front side of the lens unit 201 and on an inner peripheral side of the light-shielding member 203 being in close contact with the dome cover 101, and a space inside the dome cover 101 and on an outer peripheral side of the light-shielding member 203.

The supporting member 204, which has a cylindrical shape, is placed in a manner covering a periphery of the lens unit 201. The light-shielding member 203 is fixed to the supporting member 204 with a double-faced tape, an adhesive agent, or the like, not shown. A convex portion 204a, which extends in the direction of the optical axis, is provided in an outer peripheral portion of the supporting member 204 and engaged with a groove portion 208a formed in an inner peripheral portion of the tilt base 208 movably in the direction of the optical axis. As a result, the supporting member 204 is supported with respect to the lens unit 201 movably in the direction of the optical axis. It should be noted that the means for supporting the lens unit 201 movably in the direction of the optical axis is not limited to this.

The supporting member 204 is urged in the direction of the optical axis of the lens unit 201 by a spring member 205. It should be noted that although in the example shown in FIG. 2, the one spring member 205 urges the supporting member 204, and a center of the spring member 205 and a center of the optical axis of the lens unit 201 correspond to each other, the structure of the image pickup unit is not limited to this. Namely, the center of the spring member 205 and the center of the optical axis of the lens unit 201 should not necessarily correspond to each other, and the number of spring member 205 may be plural.

The main base 212 is fixed to the upper cover 103 by screws or the like. The pan base 211 is supported with respect to the main base 212 rotatably about a pan rotation axis P in a panning direction. The pan base is fixed with respect to the main base 212 by the fixing member 210 rotatably in the panning direction. Examples of a structure for rotatably fixing the pan base 211 to the main base 212 include a structure in which the pan base 211 is fixed to the main base 212 with elastic components such as wave washers or metal sheets, or screws, not shown, an engaging structure using gears, and a structure in which rotation of gears is electronically controlled using a motor.

Here, whether or not temperature has dropped to such a temperature that condensation, frost, or the like would occur is determined, and the heater 19 is turned on by a CPU or the like of the control substrate 10 based on image data obtained from an image pickup device of the lens unit 11 or information obtained from a temperature sensor or the like, not shown, mounted on the control substrate 10. This control mode is defined as a first control mode.

The lens unit 201 is supported with respect to the pan base 211 by the tilt base 208 rotatably about a tilt rotation axis T in a tilting direction. The lens unit 201 is fixed to the tilt base 208 by screws or the like. The tilt base 208 is fixed with respect to the pan base 211 by the fixing members 209 rotatably about the tilt rotation axis T in the tilting direction. Examples of a structure for rotatably fixing the tilt base 208 to the pan base 211 include a structure in which screw, flat washers, or spring washers are used to exert holding power, and a structure in which an elastic body is sandwiched between the tilt base 208 and the pan base 211 to exert holding power. As with the structure for the panning action, the examples also include an engaging structure using gears and a structure in which rotation of gears is electronically controlled using a motor.

Figure 3:
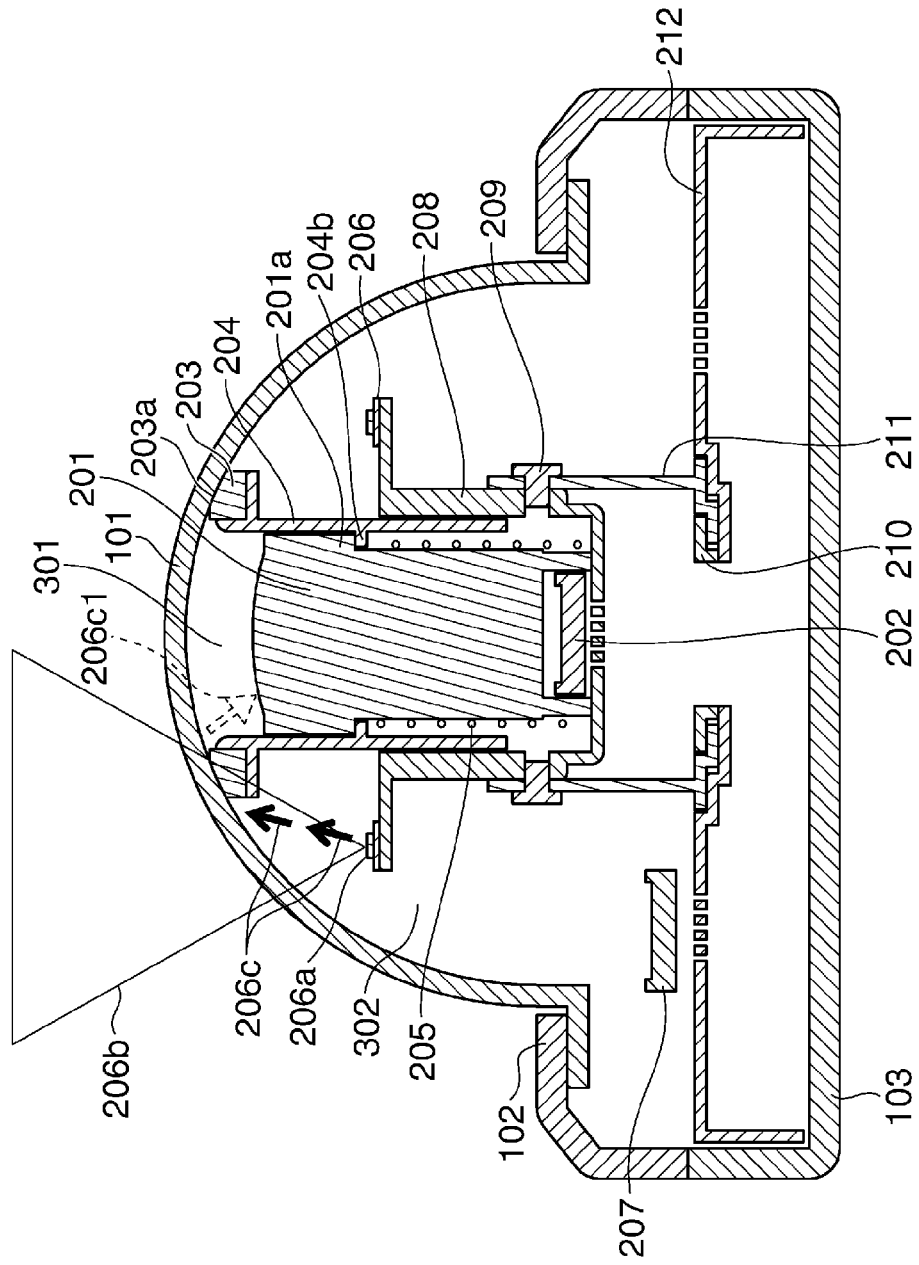
FIG. 3 is a cross-sectional view schematically showing essential parts of the network surveillance camera.

FIG. 3 is a cross-sectional view schematically showing the monitoring camera. As shown in FIG. 3, the light-shielding member 203 is brought into close contact with the dome cover 101 by urging force of the spring member 205 or deformation of the light-shielding member 203 itself. Due to the light-shielding member 203 being brought into close contact with the dome cover 101, illumination light 206b emitted from the illumination unit 206a is prevented from being reflected by the dome cover 101 and entering the lens unit 201.

It should be noted that the light-shielding member 203 may be a rigid body, but it is preferred that it is an elastic body or a foam body so as to improve adhesion to the dome cover 101, prevent damage to the dome cover 101, and improve absorption of shock to the lens unit 201. A light gathering unit or a diffusing unit for the illumination light 206b may be provided in the direction in which illumination unit 206a emits the illumination light 206b so that the illumination light 206b can be emitted toward a shooting range.

A movable range of the supporting member 204 is limited by engaging a flange portion 204b of the supporting member 204 with a flange portion 201a of the lens unit 201 so as to prevent the supporting member 204 from falling off the lens unit 201 and the tilt base 208 toward the front side, and is urged toward the front side by the spring member 205. It should be noted that in addition to the flange portions 204b and 201a, a flange portion may be provided in the tilt base 208 so as to limit the movable range of the supporting member 204. Although in the present embodiment, the light-shielding member 203 is brought into close contact with the dome cover 101 by the supporting member 204 and the spring member 205, the light-shielding member 203 may be brought into close contact with the dome cover 101 by an another structure.

As described earlier, the light-shielding member 203 prevents illumination light 206c, which is a part of the illumination light 206b emitted from the illumination unit 206a, from being reflected by inner and outer surfaces of the dome cover 101, and after a small number of reflections, entering the lens unit 201. Without the light-shielding member 203, reflected light 206c1 (indicated by broken lines in FIG. 3) of the illumination light 206c would enter the lens unit 201 and appear in a captured image.

Moreover, the groove portions 203b formed in the light-shielding member 203 enable circulation of air between the space on the front side of the lens unit 201 and on the inner peripheral side of the light-shielding member 203 being in close contact with the dome cover 101 and the space inside the dome cover 101 and on the outer peripheral side of the light-shielding member 203. The circulation of air through the groove portion 203b prevents formation of condensation and frost on the inner and outer surfaces of the dome cover 101 in a low-temperature environment or the like.

Figure 4A:
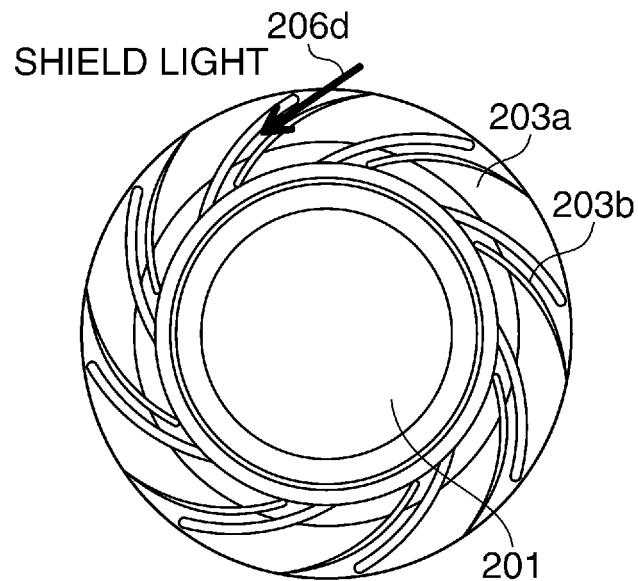
FIGS. 4A and 4B are views useful in a light-shielding member.
Figure 4B:
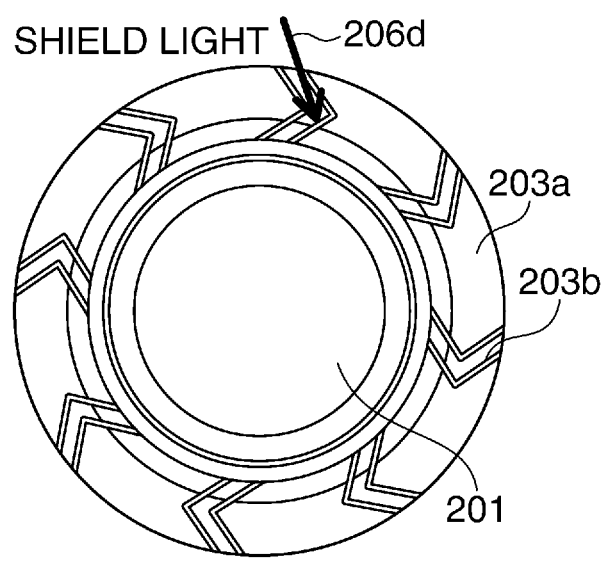

Referring next to FIGS. 4A and 4B, a detailed description will be given of the light-shielding member 203. FIGS. 4A and 4B are based on the assumption that from an arbitrary position and angle, reflected light 206d of the illumination light 206b reaches the light-shielding member 203. FIG. 4A is a view showing the light-shielding member 203 having the groove portions 203b which have a spiral shape.

As shown in FIG. 4A, the reflected light 206d emitted from the illumination unit 206a and reflected by the dome cover 101 travels in straight lines. Referring to FIG. 4A, the groove portions 203b are formed in a spiral shape largely curved like an arc with respect to the reflected light 206d that travels in straight lines, and hence the reflected light 206d is absorbed or reflected and attenuated by the light-shielding member 203 before entering the lens unit 201. The same holds for reflected light other than the reflected light indicated by the arrow in FIG. 4A.

On the other hand, air does not travel in straight lines and hence is able to flow and circulate along the spiral groove portions 203b. Namely, as shown in FIG. 4A, the light-shielding member 203 having the spiral groove portions 203b achieves breathability and imperviousness to light at the same time. It should be noted that there are many combinations of the number of groove portions 203b, widths and curvatures of the groove portions 203b, and so forth other than the example shown in the figure. The groove portions 203b may be filled with a highly breathable material so as to be brought into contact with the dome cover 101, or may be subjected to surface treatment, antireflection coating, or the like so as to reduce reflection of light.

FIG. 4B is a view showing the light-shielding member 203 having the groove portions 203b which are shaped like a crank. In the example shown in FIG. 4B as well, the groove portions 203b are bent like a crank with respect to the reflected light 206d that travels in straight lines, and hence the reflected light 206d is absorbed or reflected and attenuated by the light-shielding member 203 before entering the lens unit 201 as with the example shown in FIG. 4A. The same holds for reflected light other than the reflected light indicated by the arrow in FIG. 4B.

On the other hand, air does not travel in straight lines and hence is able to flow and circulate along the crank-shaped groove portions 203b. Namely, as with the example shown in FIG. 4A, the light-shielding member 203 having the crank-shaped groove portions 203b achieves breathability and imperviousness to light at the same time. It should be noted that there are many combinations of the number of groove portions 203b, widths of the groove portions 203b, the number of bends in a crank shape, and so forth other than the example shown in the figure. Thus, the light-shielding member 203 in which the groove portions 203b connects the outer peripheral portion and the inner peripheral portion of the light-shielding member 203 to each other achieves breathability and imperviousness to light at the same time.

Figure 5A:
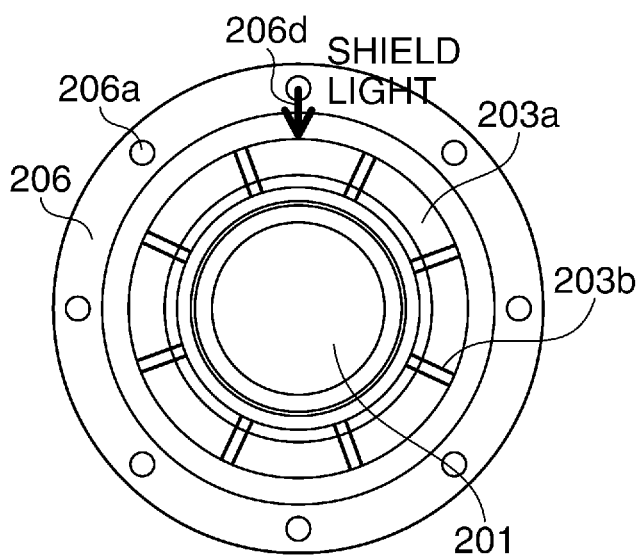
FIGS. 5A and 5B are views showing a shape of the light-shielding member and a positional relationship between the light-shielding member and an illumination unit.
Figure 5B:
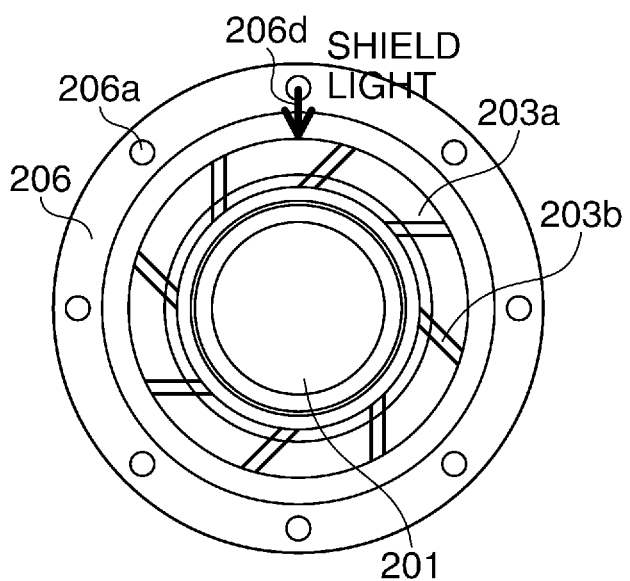

FIGS. 5A and 5B are views showing a shape of the light-shielding member 203 and a positional relationship between the light-shielding member 203 and the illumination unit 206a. FIGS. 4A and 4B are based on the assumption that from an arbitrary position and angle, the reflected light 206d of the illumination light 206b reaches the light-shielding member 203, but in fact, the reflected light 206d is attenuated through a plurality of reflections on a variety of areas and thus unlikely to enter the lens unit 201.

Therefore, the following description with reference to FIGS. 5A and 5B is based on the assumption that the reflected light 206d of the illumination light 206b emitted from the illumination unit 206a is likely to directly enter the lens unit 201 and appear in a captured image.

FIG. 5A is a view showing an example of the light-shielding member 203 having the groove portions 203b which have a linear shape. The groove portions 203b shown in FIG. 5A are formed linearly in a radial direction of the lens unit 201 and at locations away from straight lines connecting the illumination units 206 and a center of the optical axis of the lens unit 201 to each other. As shown in FIG. 5A, with respect to the reflected light 206d reflected by the dome cover 101 and traveling in straight lines, the close contact portion 203a lies in a direction in which the reflected light 206d falls upon the lens unit 201, that is, on the straight lines connecting the illumination units 206 and the center of the optical axis of the lens unit 201 to each other. For this reason, the reflected light 206d is absorbed/reflected by the light-shielding member 203.

On the other hand, air does not travel in straight lines and hence is able to flow and circulate along the linear groove portions 203b described above. Namely, the light-shielding member 203 having the linear groove portions 203b shown in FIG. 5A achieves breathability and imperviousness to light at the same time. It should be noted that there are many combinations of the number of groove portions 203b, widths of the groove portions 203b, and so forth other than the example shown in the figure.

FIG. 5B is a view showing another example of the light-shielding member 203 having the groove portions 203b which have a linear shape. The groove portions 203b shown in FIG. 5B are formed linearly in a direction that crosses the radial direction of the lens unit 201. The light-shielding member 203 having the linear groove portions 203b shown in FIG. 5B as well achieves breathability and imperviousness to light at the same time as with the example shown in FIG. 5A. It should be noted that there are many combinations of the number of groove portions 203b, widths and angles of the groove portions 203b, and so forth other than the example shown in the figure.

Thus, the light-shielding member 203 having the close contact portion 203a lying on the straight lines connecting the illumination units 206a and the center of the optical axis of the lens unit 201 to each other achieves breathability and imperviousness to light at the same time. It should be noted that forming minute concaves and convexes on surfaces of the groove portions 203b of the light-shielding member 203 in FIGS. 4A and 4B and FIGS. 5A and 5B would reduce reflection of the reflected light 206d and improve imperviousness to light.

Figure 6:
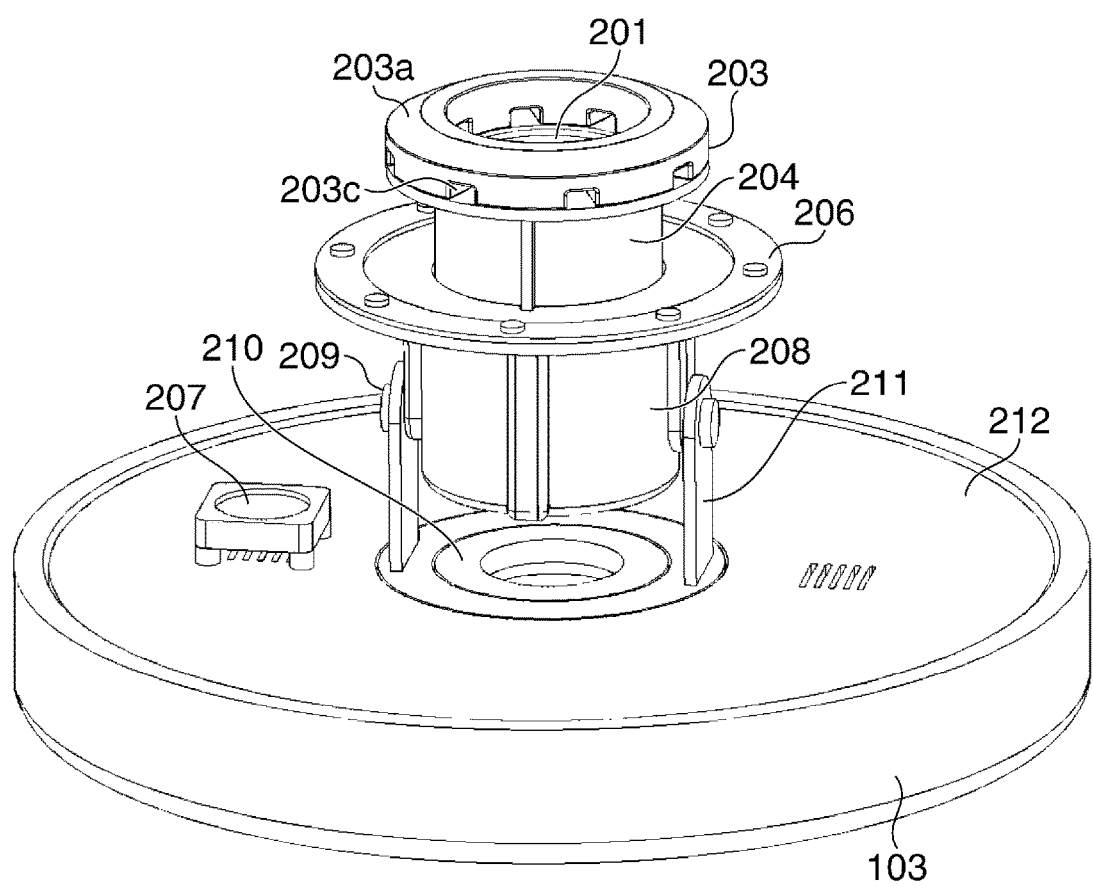
FIG. 6 is a partially perspective view showing the image pickup unit having the light-shielding member in which groove portions are formed on a supporting member side.

FIG. 6 is a partially perspective view showing the image pickup unit 2 having the light-shielding member 203 in which groove portions 203c are formed on the supporting member 204 side.

The groove portions 203c are formed so as to connect the outer peripheral portion and the inner peripheral portion of the light-shielding member 203 with each other. As with the groove portions 203b in FIGS. 4A and 4B and FIGS. 5A and 5B, shapes of the groove portions 203c may in various combinations of a spiral shape, a crank shape, a linear shape, and so forth. The close contact portion 203a provided on a surface of the light-shielding member 203 which is opposed to the dome cover 101 is substantially annular in shape and formed over the whole circumference of the light-shielding member 203. As a result, light reflected by the dome cover 101 is satisfactorily shielded. Moreover, since the groove portions 203c are formed on the supporting member 204 side, the light-shielding member 203 achieves breathability and imperviousness to light at the same time.

Figure 7:
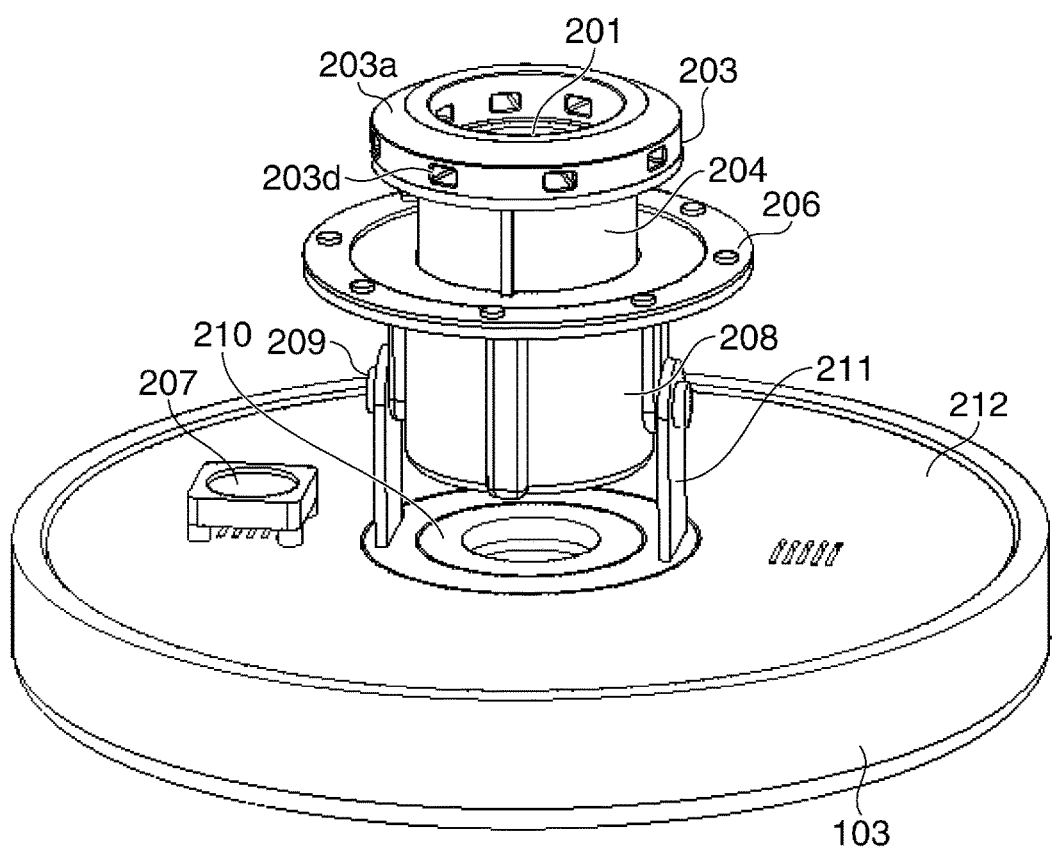
FIG. 7 is a partially perspective view showing the image pickup unit having the light-shielding member in which holes are formed.

FIG. 7 is a partially perspective view showing the image pickup unit 2 having the light-shielding member 203 in which holes 203d are formed.

The holes 203d are formed so as to connect an outer peripheral portion and an inner peripheral portion of the light-shielding member 203 with each other. As with the groove portions 203b in FIGS. 4A and 4B and FIGS. 5A and 5B, shapes of the holes 203d may in various combinations of a spiral shape, a crank shape, a linear shape, and so forth. Cross-sectional shapes of the holes 203d should not necessarily be uniform, but may be variable as long as the object of the present invention is accomplished in terms of circulation of air generated by, for example, the fans 202 and 207. The close contact portion 203a provided on a surface of the light-shielding member 203 which is opposed to the dome cover 101 is substantially annular in shape and formed over the whole circumference of the light-shielding member 203. As a result, light reflected by the dome cover 101 is satisfactorily shielded. Moreover, due to the presence of the holes 203d connecting the outer peripheral portion and the inner peripheral portion of the light-shielding member 203 to each other, the light-shielding member 203 achieves breathability and imperviousness to light at the same time.

Figure 8:
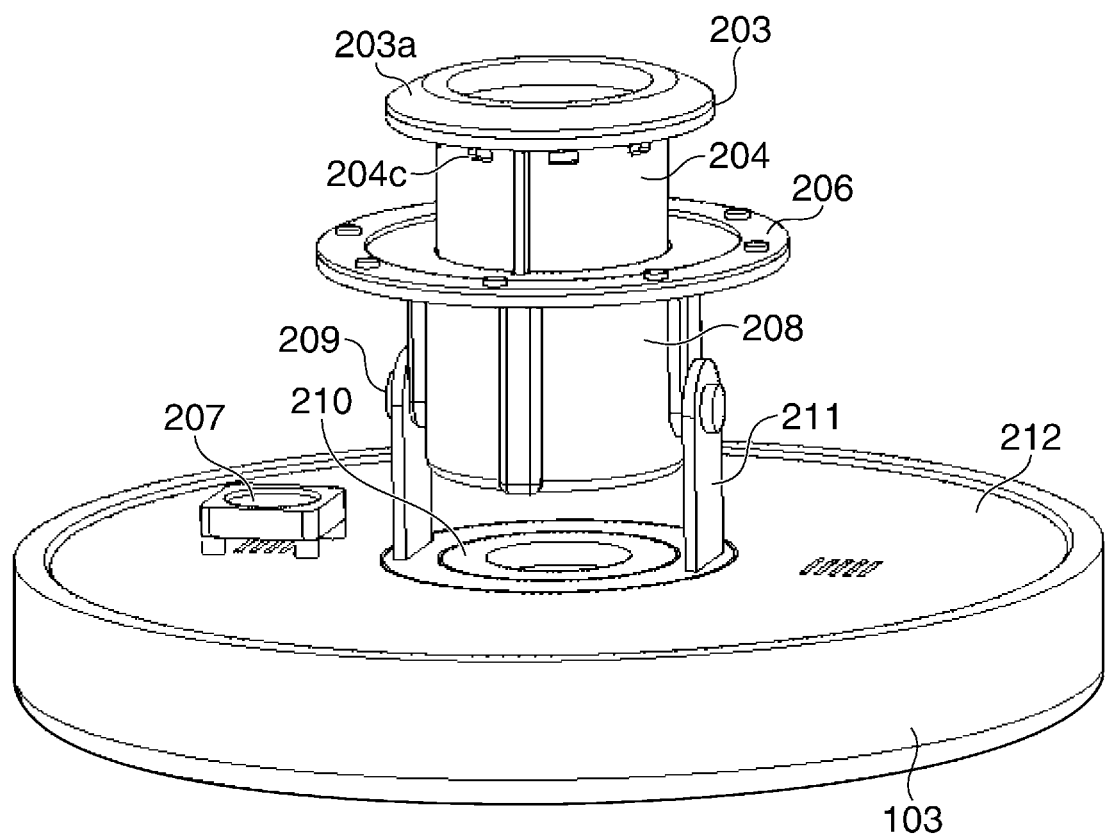
FIG. 8 is a partially perspective view showing the image pickup unit having the supporting member in which holes are formed.

FIG. 8 is a partially perspective view showing the image pickup unit 2 having the supporting member 204 in which holes 204 are formed.

The holes 204c are formed so as to connect an outer peripheral portion and an inner peripheral portion of the supporting member 204 to each other. As with the groove portions 203b in FIGS. 4A and 4B and FIGS. 5A and 5B, shapes of the holes 204c may in various combinations of a spiral shape, a crank shape, a linear shape, and so forth. Due to the presence of the holes 204c which connect the outer peripheral portion and the inner peripheral portion of the supporting member 204 to each other, the supporting member 204 achieves breathability and imperviousness to light at the same time.

It should be noted that, when the holes 204c are provided in the supporting member 204, it is necessary to form the holes 204c at positions such that the 204c do not oppose to the lens unit 201. Accordingly, the supporting member 204 is extended in the direction of the optical axis for providing the holes 204c, and the holes 204c are formed at upper portions of the supporting member 204 such that the holes 204c do not oppose to the lens unit 201. In this case, since the supporting member extends in the direction of the optical axis by an area for providing the hole 204c, the space inside the dome cover 101 needs to be enlarged as compared to a case where the groove portions 203c or the holes 203d are provided in the light-shielding member 203. Therefore, the holes 204c may be provided with consideration given to a shape of the lens unit 201. For example, when the lens unit 201 has what is called a D-cut shape formed by cutting away a part of an outer peripheral portion of the lens unit 201, the holes 204c may be provided in the supporting member 204 such that the holes 204c oppose to the cut-away part of the D-cut shape. Since the cut-away part of the D-cut shape of the lens unit 201 does not block the holes 204c, breathability is ensured even if the holes 204c is provided in the supporting member 204 at any positions in the direction of the optical axis. Accordingly, the supporting member 204 does not have to be extended in the direction of the optical axis. As a result, the space inside the dome cover 101 does not need to be enlarged for accommodating the supporting member 204 which is extended in the direction of the optical axis, and hence the surveillance camera is miniaturized.

As described above, according to the present embodiment, in the surveillance camera equipped with the illumination unit 206a, since circulation of air inside the surveillance camera is improved while imperviousness to light is ensured, formation of condensation and frost on the inner and outer surfaces of the dome cover 101 is prevented. As a result, images with high sharpness are obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-095440, filed May 11, 2016, and No. 2017-062928, filed Mar. 28, 2017 which are hereby incorporated by reference herein in their entirety.

What is claimed is:

1. An image pickup apparatus comprising:
a lens unit;
a cover configured to protect the lens unit;
an illumination unit configured to be provided around the lens unit and emit illumination light toward a subject through the cover; and
an annular light-shielding member configured to be provided between the lens unit and the cover in a state of being in close contact with the cover and to shield reflected light of the illumination light so as to prevent the illumination light emitted from the illumination unit and reflected by the cover from entering the lens unit,
wherein the light-shielding member has a circulation path that enables circulation of air between an inner space of the light-shielding member and an outer space of the light-shielding member.

2. The image pickup apparatus according to claim 1, wherein the circulation path comprises groove portions formed on a surface of the light-shielding member on a side that is brought into close contact with the cover.

3. The image pickup apparatus according to claim 1, wherein the circulation path comprises groove portions formed on a surface of the light-shielding member which is opposed to a surface of the light-shielding member on a side that is brought into close contact with the cover.

4. The image pickup apparatus according to claim 1, wherein the circulation path comprises holes that are formed to connect an outer peripheral portion and an inner peripheral portion of the light-shielding member to each other.

5. The image pickup apparatus according to claim 1, wherein the cover is shaped like a dome.

6. The image pickup apparatus according to claim 1, wherein a close contact portion of the light-shielding member that is brought into close contact with the cover is placed on a straight line in the light-shielding member that connects a center of an optical axis of the lens unit and the illumination unit to each other.

7. The image pickup apparatus according to claim 1, wherein the light-shielding member is formed of a foam body or an elastic body.

8. The image pickup apparatus according to claim 1, wherein minute concaves and convexes are formed in the circulation path.

9. The image pickup apparatus according to claim 1, further comprising a fan unit configured to circulate air inside the cover.

10. The image pickup apparatus according to claim 1, further comprising a supporting member configured to support the lens unit movably in a direction of an optical axis, wherein the supporting member is provided with the light-shielding member.

11. The image pickup apparatus according to claim 1, wherein the lens unit is supported rotatably in a panning direction and a tilting direction.

12. An image pickup apparatus comprising:
a lens unit;
a cover configured to protect the lens unit;
an illumination unit configured to be provided around the lens unit and emit illumination light toward a subject through the cover; and
an annular light-shielding member configured to be provided between the lens unit and the cover in a state of being in close contact with the cover and to shield reflected light of the illumination light so as to prevent the illumination light emitted from the illumination unit and reflected by the cover from entering the lens unit; and
a supporting member configured to support the lens unit movable in a direction of an optical axis,
wherein the supporting member has a circulation path that enables circulation of air between an inner space of the supporting member and an outer space of the supporting member.

13. The image pickup apparatus according to claim 12, wherein the circulation path comprises holes formed so as to connect an outer peripheral portion and an inner peripheral portion of the supporting member with each other.

14. The image pickup apparatus according to claim 12, wherein the circulation path does not oppose to the lens unit.

15. An image pickup apparatus comprising:
a lens unit;
a cover configured to protect the lens unit; and
an annular light-shielding member configured to be provided between the lens unit and the cover in a state of being in close contact with the cover and to shield reflected light of illumination light so as to prevent the illumination light reflected by the cover from entering the lens unit,
wherein the light-shielding member has a circulation path that enables circulation of air between an inner space of the light-shielding member and an outer space of the light-shielding member.

* * * * *